(12) United States Patent
Li et al.

(10) Patent No.: US 10,789,849 B2
(45) Date of Patent: Sep. 29, 2020

(54) SYSTEM AND METHOD FOR PROVIDING ROAD CONDITION INFORMATION

(71) Applicants: LITE-ON ELECTRONICS (GUANGZHOU) LIMITED, Guangzhou (CN); Lite-On Technology Corporation, Taipei (TW)

(72) Inventors: Hung-Chun Li, Taipei (TW); Pei-Yuan Lien, Taipei (TW); Yao-Chung Yeh, Taipei (TW); Kuo-Hao Huang, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 22 days.

(21) Appl. No.: 16/009,233

(22) Filed: Jun. 15, 2018

(65) Prior Publication Data

US 2019/0325753 A1 Oct. 24, 2019

(30) Foreign Application Priority Data

Apr. 18, 2018 (CN) .......................... 2018 1 0347235

(51) Int. Cl.
*G08G 1/16* (2006.01)
*G06K 9/00* (2006.01)
*G08G 1/07* (2006.01)
*G08G 1/09* (2006.01)
*G08G 1/01* (2006.01)
*G08G 1/04* (2006.01)
*G08G 1/0967* (2006.01)

(52) U.S. Cl.
CPC ......... *G08G 1/164* (2013.01); *G06K 9/00785* (2013.01); *G08G 1/07* (2013.01); *G08G 1/091* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,900,825 A | * | 5/1999 | Pressel | G01C 21/3629 340/905 |
| 2003/0090392 A1 | * | 5/2003 | Schuessler | G08G 1/162 340/988 |
| 2005/0280553 A1 | * | 12/2005 | DiPiazza | G08G 1/096758 340/905 |
| 2009/0099726 A1 | * | 4/2009 | Kim | G08G 1/096888 701/36 |
| 2009/0262189 A1 | * | 10/2009 | Marman | G08B 13/19613 348/143 |

(Continued)

*Primary Examiner* — Alexander Gee
(74) *Attorney, Agent, or Firm* — JCIPRNET (57) ABSTRACT

A system for providing road condition information includes a first outdoor lamp and a first camera. The first camera is disposed on the first outdoor lamp and configured to: capture an image of a surrounding of a location where the first camera is located; perform an image recognition process on the image to identify an event occurring in the surrounding; generate, based on the event, a first road condition message including location information of the event and event information of the event; and broadcast the first road condition message to a first vehicle.

16 Claims, 5 Drawing Sheets

(56) References Cited

U.S. PATENT DOCUMENTS

| | | | |
|---|---|---|---|
| 2012/0251079 A1* | 10/2012 | Meschter | G16H 40/67 386/278 |
| 2013/0242104 A1* | 9/2013 | Wang | G08G 1/096775 348/149 |
| 2015/0206188 A1* | 7/2015 | Tanigawa | G06Q 30/0261 705/14.58 |
| 2015/0310742 A1* | 10/2015 | Albornoz | G08G 1/096716 340/905 |
| 2016/0066212 A1* | 3/2016 | Visweswara | H04W 48/00 370/474 |
| 2016/0182864 A1* | 6/2016 | Izawa | H04N 7/181 348/159 |
| 2018/0024091 A1* | 1/2018 | Wang | H04W 4/80 204/431 |
| 2018/0103341 A1* | 4/2018 | Moiyallah, Jr. | G06F 3/04842 |
| 2018/0113459 A1* | 4/2018 | Bennie | G05D 1/028 |

* cited by examiner

SYSTEM AND METHOD FOR PROVIDING ROAD CONDITION INFORMATION

CROSS-REFERENCE TO RELATED APPLICATION

This application claims the priority benefit of China application serial no. 201810347235.6, filed on Apr. 18, 2018. The entirety of the above-mentioned patent application is hereby incorporated by reference herein and made a part of this specification.

BACKGROUND OF THE INVENTION

1. Field of the Invention

The disclosure relates to a system for providing information and a method for providing information, and particularly relates to a system for providing road condition information and a method for providing road condition information based on image recognition.

2. Description of Related Art

With the development of science and technology and the progress through time, people nowadays pay more attention to the safety of driving. Therefore, efforts have been made to develop relevant information systems for improving driving safety. However, most of the systems focus on detecting the surroundings of vehicles and providing relevant information, and are unable to detect road conditions at a relatively distant location. Therefore, when there is an accident at a certain location, the drivers nearby may not be able to timely respond by, for example, taking a different route. Under the circumstance, the road may be jammed, or even other accidents may occur.

Therefore, it is crucial to develop a more desirable mechanism for providing road condition information.

SUMMARY OF THE INVENTION

Exemplary embodiments of the disclosure provide a system for providing road condition information and a method for providing road condition information.

An embodiment of the disclosure provides a system for providing road condition information, including a first outdoor lamp and a first camera. The first camera is disposed on the first outdoor lamp and configured to: capture an image of a surrounding of a location where the first camera is located; perform an image recognition process on the image to identify an event occurring in the surrounding; generate a first road condition message based on the event, the first road condition message including location information of the event and event information of the event; and broadcast the first road condition message to a first vehicle.

An embodiment of the disclosure provides a method for providing road condition information. The method includes the following. An image of a surrounding of a location where a first camera is located is captured. The first camera is disposed on a first outdoor lamp. An image recognition process is performed on the image to identify an event occurring in the surrounding. A first road condition message is generated based on the event. The first road condition message includes location information of the event and event information of the event. In addition, the first road condition message is broadcast to a first vehicle.

An embodiment of the disclosure provides a camera. The camera includes a storage circuit, a transceiver, an image capturing circuit, and a processor. The storage circuit stores a plurality of program modules. The processor is coupled to the storage circuit, the transceiver, and the image capturing circuit and the processor accesses the program modules to carry out the following. The image capturing circuit is controlled to capture an image of a surrounding of a location where the camera located. An image recognition process is performed on the image to identify an event occurring in the surrounding. A road condition message is generated based on the event. The road condition message includes location information of the event and event information of the event. In addition, the transceiver is controlled to broadcast the road condition message to a vehicle.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

Figure 1:
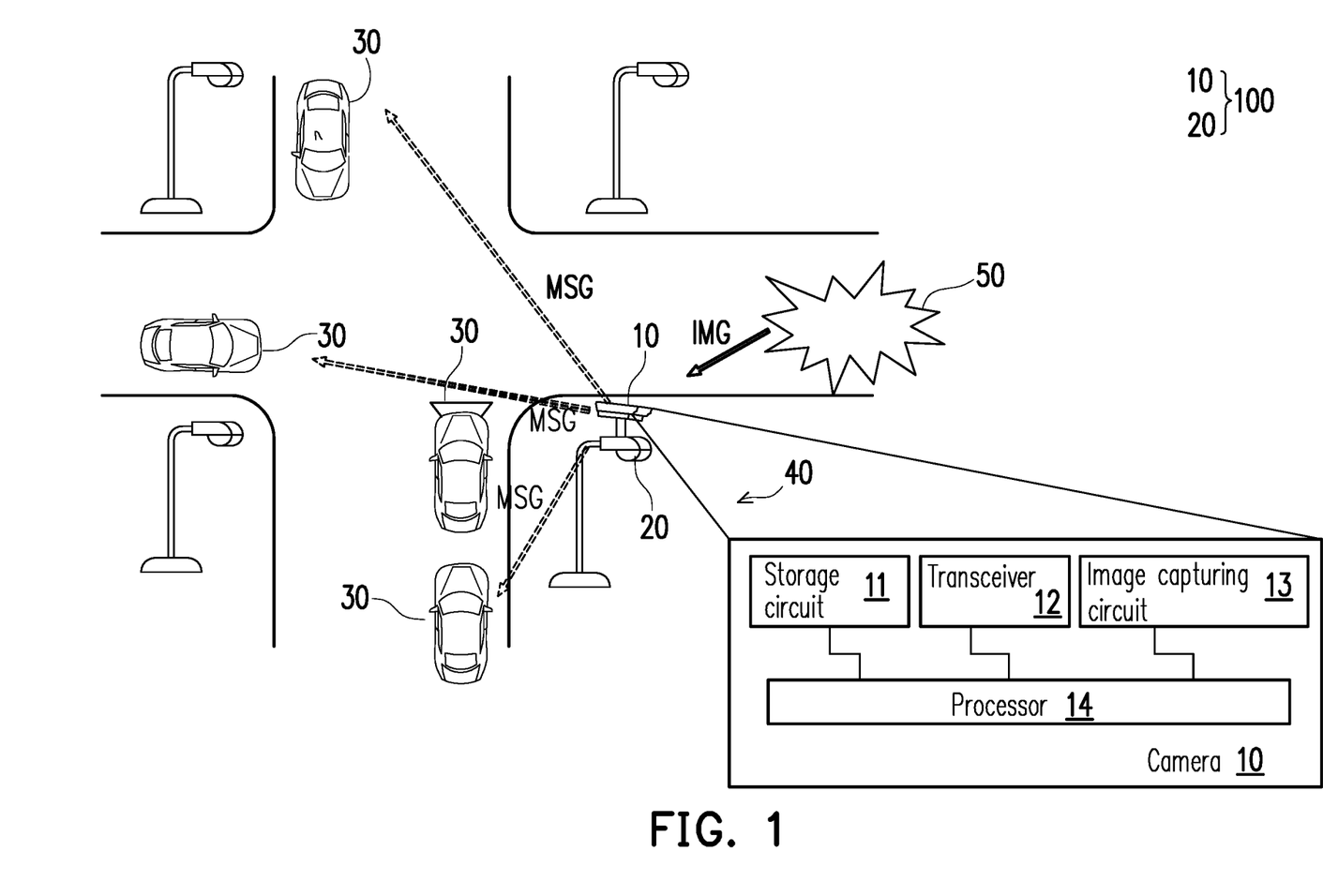
FIG. 1 is a schematic view illustrating a road condition and a system for providing road condition information according to an embodiment of the disclosure.

Referring to FIG. 1, FIG. 1 is a schematic view illustrating a road condition and a system for providing road condition information according to an embodiment of the disclosure. As shown in FIG. 1, a system 100 for providing road condition information includes a camera 10 and an outdoor lamp 20, and the camera 10 may be disposed on the outdoor lamp 20. For example, the camera 10 may be disposed on a pole of the outdoor lamp 20 or be disposed on or inside the lamp. In different embodiments, the outdoor lamp 20 may be a street lamp (e.g., a smart street lamp) as shown in FIG. 1, a traffic signal lamp having a certain height, or the like. In some embodiments, the outdoor lamp 20 may include a global positioning system (GPS) module, and may provide GPS coordinates of the outdoor lamp 20 as GPS information of the camera 10. In other embodiments, the GPS coordinates of the outdoor lamp 20 may also be provided by a server (e.g., a server S in FIG. 4).

In the embodiment, the camera 10 may include a storage circuit 11, a transceiver 12, an image capturing circuit 13, and a processor 14.

The storage circuit 11 may be any mobile or fixed random access memory (RAM), read-only memory (ROM), flash memory, hard disk in any form, or other similar devices. The storage circuit 11 may store computer readable software, images, and other information.

The transceiver 12 may at least include components such as a transmitter circuit, a receiver circuit, an analog-to-digital (A/D) converter, a digital-to-analog (D/A) converter, a low noise amplifier (LNA), a mixer, a filter, a matching circuit, a transmission line, a power amplifier (PA), one or more antennas, and a local storage medium. However, the disclosure is not limited to the components. With the components, the transceiver 12 may provide functions of wireless transmission for the camera 10 of FIG. 1.

The image capturing circuit 13 may be a charge coupled device (CCD) lens, a complementary metal oxide semiconductor (CMOS) lens, a camera with an infrared light lens, a depth camera, a stereoscopic camera, or other devices capable of capturing an image.

The processor 14 is coupled to the storage circuit 11, the transceiver 12, and the image capturing circuit 13. The processor 14 may be a processor with general purposes, a processor with a specific purpose, a conventional processor, a digital signal processor, a plurality of microprocessors, one or more microprocessors combining digital signal processor cores, a controller, a microcontroller, an application specific integrated circuit (ASIC), a field programmable gate array (FPGA), any other types of integrated circuits, state machines, processors based on advanced RISC machines (ARM) or other devices capable of processing and exerting control.

In the embodiments of the disclosure, the processor 14 may access program modules in the storage circuit 11 to work with the transceiver 12 and the image capturing circuit 13 and thereby complete a method for providing road condition information according to the embodiments of the disclosure. Details in this regard will be described in the following.

Figure 2:
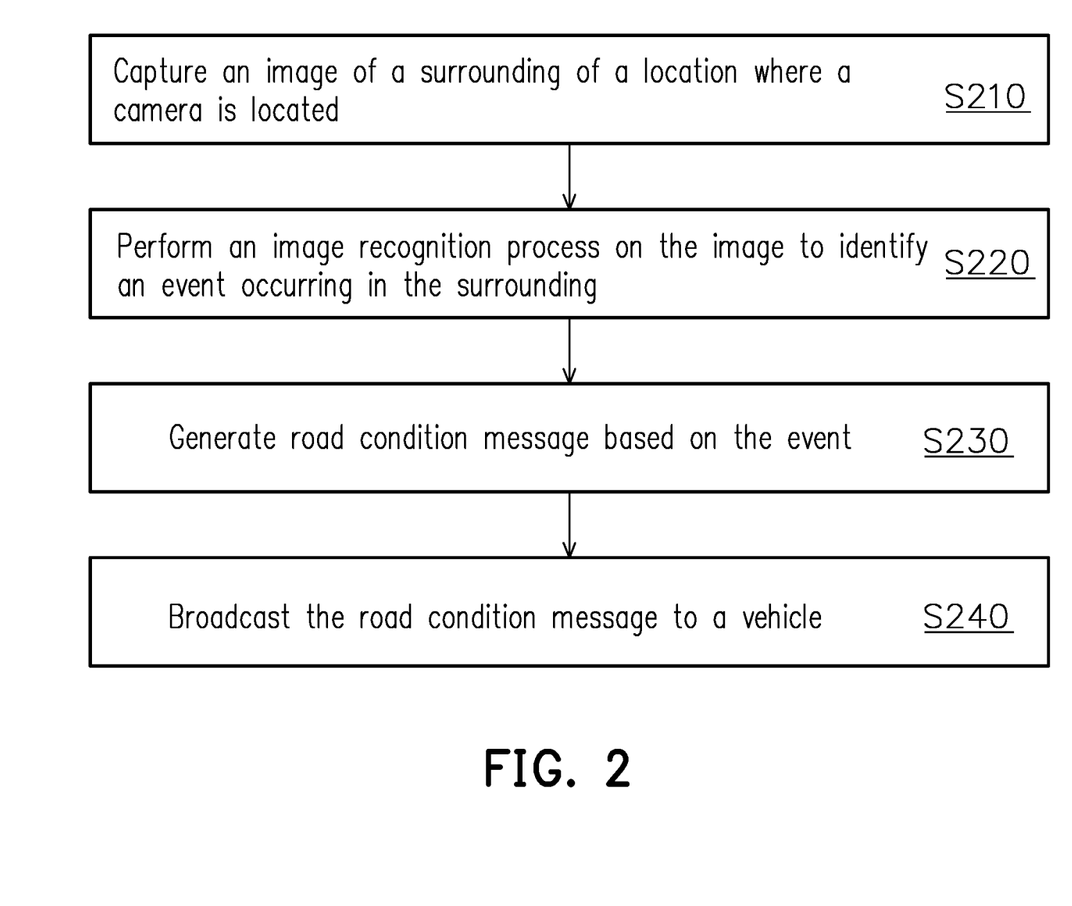
FIG. 2 is a flowchart illustrating a method for providing road condition information according to an embodiment of the disclosure.

Referring to FIG. 2, FIG. 2 is a flowchart illustrating a method for providing road condition information according to an embodiment of the disclosure. The method according to the embodiment may be performed by the camera 10 shown in FIG. 1. In the following, details of the respective steps of the method are described with reference to FIG. 1.

First of all, at Step S210, the processor 14 may control the image capturing circuit 13 to capture an image IMG of a surrounding 40 of a location where the camera 10 is located. The location marked for the surrounding 40 in FIG. 1 only serves as an example, and the surrounding 40 refers to a range under the surveillance of the camera 10.

At Step S220, the processor 14 may perform an image recognition process on the image IMG to identify an event 50 that occurs in the surrounding 40. In the embodiment, the processor 14 may perform the image recognition process on the image IMG by exploiting any image recognition technology as applicable. In different embodiments, the event 50 may include fog, obstacles, traffic accidents, floods, mudflows, gas explosions, vehicles violating traffic rules, parking lots, road condition (e.g., sunny or rainy, one-way street, falling of the night, or the like), or other events requiring the camera 10 to detect as defined by the designer (e.g., whether there is any passenger appearing near a bus stop and intending to take a bus or any passenger appearing near a taxi stand and intending to take a taxi). However, the disclosure is not limited thereto.

At Step S230, the processor 14 may generate road condition message MSG based on the event 50. In addition, the road condition message MSG includes location information of the event 50 and event information of the event 50. For example, the location information may be inferred from the GPS coordinates of the outdoor lamp 20, and may specifically indicate a location where the event 50 occurs, such as an intersection, a street, an address, or a nearby landmark or building. However, the disclosure is not limited thereto. Besides, the event information may specifically indicate the aspect of the event 50, such as fog, obstacles, traffic accidents, floods, mudflows, gas explosions, vehicles violating traffic rules, parking lots, road condition, or the like. However, the disclosure is not limited thereto.

Then, at Step S240, the processor 14 may control the transceiver 12 to broadcast the road condition message MSG to vehicles 30. The vehicles 30 may include a bus, a car, a fire truck, an ambulance, a driverless vehicle, a taxi, and the like, for example. In different embodiments, vehicle systems of the vehicles 30 may be installed with a specialized software component capable of decoding (or interpreting) the road condition message MSG, or the vehicles 30 may be mounted with a specific device capable of decoding the road condition message MSG. Nevertheless, the disclosure is not limited thereto. Therefore, after the vehicles 30 receive the road condition message MSG, the vehicles 30 may decode the road condition message MSG, learn exactly which event occurs and a location where the event occurs based on contents decoded from the road condition message MSG, and provide the information to the drivers as a speech or text prompt for the drivers' reference. Thus, the driver or a driverless vehicle system may respond by, for example, taking a different route to avoid traffic jam or other accidents.

In some embodiments, the road condition message MSG may have a specific format, and the transceiver 12 may transmit the road condition message MSG based on a specific communication protocol (e.g., Zigbee). Accordingly, only the vehicles 30 meeting the communication protocol or capable of decoding the road condition message MSG are able to decode the road condition message MSG and retrieve the road condition information (e.g., the location and the aspect of the event 50) in the road condition message MSG accordingly.

In some other embodiments, the format of the road condition message MSG may further include a certification field for the vehicles 30 meeting a predetermined condition to identify. As an example, the certification field may specifically indicate a vehicle type for which the road condition message MSG is intended, such as a bus, a fire truck, an ambulance, a driverless vehicle, a taxi, and the like. Assuming that the certification field indicates that the road condition message MSG is transmitted for fire trucks, when a fire truck receives the road condition message MSG, the fire truck may determine that the fire truck is the target receiver of the road condition message MSG based on the certification field in the road condition message MSG and thus decode the road condition message MSG and retrieve the road condition information in the road condition message MSG. Alternatively, when other vehicles being not a fire truck receive the road condition message MSG, these vehicles may directly ignore the road condition message MSG. In another example, when the aspect of the event 50 detected by the camera 10 relates to a passenger appearing near a bus stop and intending to take a bus, the certification field in the road condition message MSG may be set as bus-only. Therefore, when a bus receives the road condition message MSG, the bus may determine that the bus is the target receiver of the road condition message MSG based on the certification field in the road condition message MSG and thus decode the road condition message MSG to retrieve the traffic condition information in the road condition message MSG. Alternatively, when other vehicles being not a bus receive the road condition message MSG, these vehicles may directly ignore the road condition message MSG.

Based on the above, the embodiments of the disclosure may provide a mechanism for certification, which prevents some non-eligible vehicles from retrieving the road condition information in the road condition message MSG when receiving the road condition message MSG.

In some embodiments, the road condition message MSG may include first warning information and second warning information. The first warning information is exclusively for a first vehicle meeting a first predetermined condition, and the second warning information is exclusively for a second vehicle meeting a second predetermined condition. For example, when the event 50 is a traffic accident or a similar event that causes damages, vehicles such as fire trucks or ambulances (referred to as first vehicles in the following) should rush to the location of the event 50 as soon as possible for relevant rescuing operations. However, for vehicles chauffeuring passengers (e.g., buses, cars, taxis, driverless vehicles, etc., referred to in the following as second vehicles), these vehicles should take a different route to avoid passing through the location of the event. Under the circumstance, the road condition message MSG may include "rushing to the location as soon as possible", for example, as the first warning information and arrange a first certification field corresponding to fire trucks and ambulances, so that the fire trucks and ambulances may remind the drivers in the fire trucks and ambulances to rush to the location for rescuing as soon as possible after receiving the road condition message MSG. Besides, the road condition message MSG may also include "recommending to take another route", for example, as the second warning information, and arrange a second certification field corresponding to vehicles chauffeuring passengers, so that the vehicles chauffeuring passengers may remind drivers in the vehicles to take another route as soon as possible after receiving the road condition message MSG.

Besides, in some embodiments, the camera 10 may conduct detection for a specific predetermined event, and when the event 50 that is detected to be matching the predetermined event, a specific certification code corresponding to the predetermined event may be added to the road condition message MSG. For example, to look for a person, a pet, or the like, the camera 10 may be configured to detect whether a specific person or animal is present in the surrounding 40. Under the circumstance, if the event 50 indicates that the camera 10 detects a specific person A, the camera 10 may determine that the event 50 matches the predetermined event and add the corresponding specific certification code to the road condition message MSG. In addition, with the specific certification code, only a specific vehicle (e.g., the vehicle of the family of the person A) is allowed to decode the road condition message MSG. Accordingly, the family of the person A may be notified in a timely manner and go to the location of the event 50 to find the person A. Hence, people searching may be conducted more efficiently. In other embodiments, if the person A is a criminal suspect, the specific certification code may be designed so that only police vehicles are allowed to decode the road condition message MSG. Hence, relevant police staff may have a grasp of the whereabouts of the person A as soon as possible. However, the disclosure is not limited thereto.

Figure 3A:
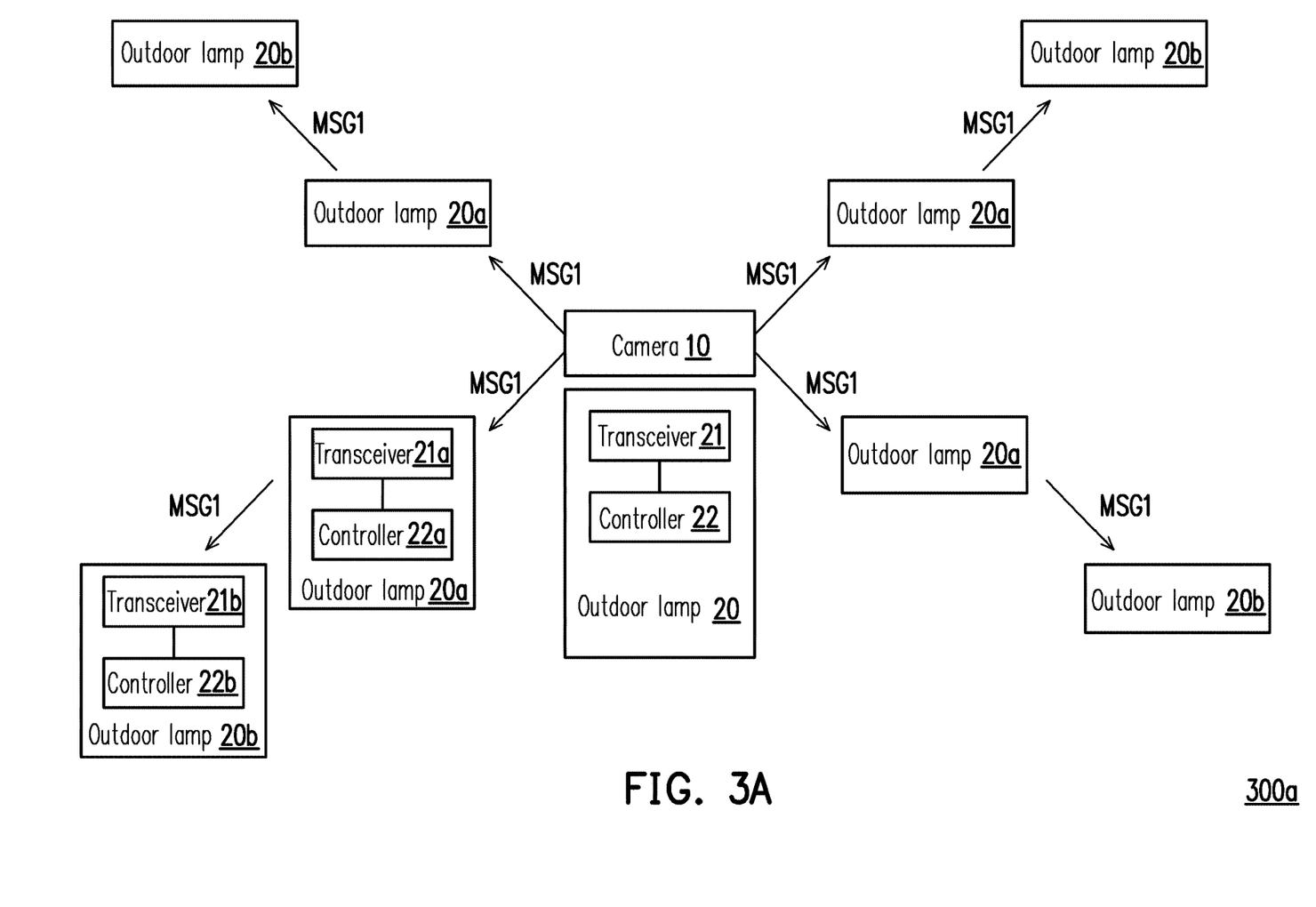
FIG. 3A is a schematic diagram illustrating a system for providing road condition information according to an embodiment of the disclosure.

Referring to FIG. 3A, FIG. 3A is a schematic diagram illustrating a system for providing road condition information according to an embodiment of the disclosure. As shown in FIG. 3A, a system 300a for providing road condition information includes the camera 10, the outdoor lamps 20, 20a, and 20b. In addition, the outdoor lamp 20 includes a transceiver 21 and a controller 22 coupled to each other, and the respective possible embodiments of the transceiver 21 and the controller 22 are similar to the embodiments of the transceiver 12 and the processor 14 shown in FIG. 1. Therefore, details in this regard will not be repeated in the following. Besides, the outdoor lamps 20a and 20b may have structures similar or identical to the structure of the outdoor lamp 20. Thus, details thereof may be referred to relevant teaching in the foregoing embodiments.

As shown in FIG. 3A, the camera 10 may carry out the respective steps in FIG. 2 based on the teaching of the foregoing embodiments, and generate and broadcast road condition message MSG1. In the embodiment, in addition to vehicles within a communication range of the camera 10, the outdoor lamp 20a in the communication range of the camera 10 may also receive the road condition message MSG1 from the camera 10 via a transceiver 21a included in the outdoor lamp 20a. Moreover, the controller 22a of the outdoor lamp 20a may control the transceiver 21a of the outdoor lamp 20a to forward and broadcast the road condition message MSG1 to other vehicles and other outdoor lamps (e.g., the outdoor lamps 20b) within communication ranges of the outdoor lamp 20a. Accordingly, a vehicle relatively distant from a location of the location information may be informed of the road condition information from the road condition message MSG1, so the driver is allowed to take a responding action as soon as possible.

More specifically, in addition to the vehicles within the communication ranges of the outdoor lamp 20a, the outdoor lamp 20b within the communication ranges of the outdoor lamp 20a may also receive the road condition message MSG1 from the transceiver 21a of the outdoor lamp 20a by a transceiver 21b included in the outdoor lamp 20b. When the transceiver 21b of the outdoor lamp 20b receive the road condition message MSG1 from the transceiver 21a of the outdoor lamp 20a, the controller 22b of the outdoor lamp 20b may also control the transceiver 21b of the outdoor lamp 20b to forward the road condition message MSG1 to other vehicles. Hence, the range of transmission of the road condition message MSG1 may be further expanded, and vehicles even more distant from the location of the location information may be informed of the road condition information from the road condition message MSG1. Accordingly, more drivers are able to take a responding action as soon as possible.

Figure 3B:
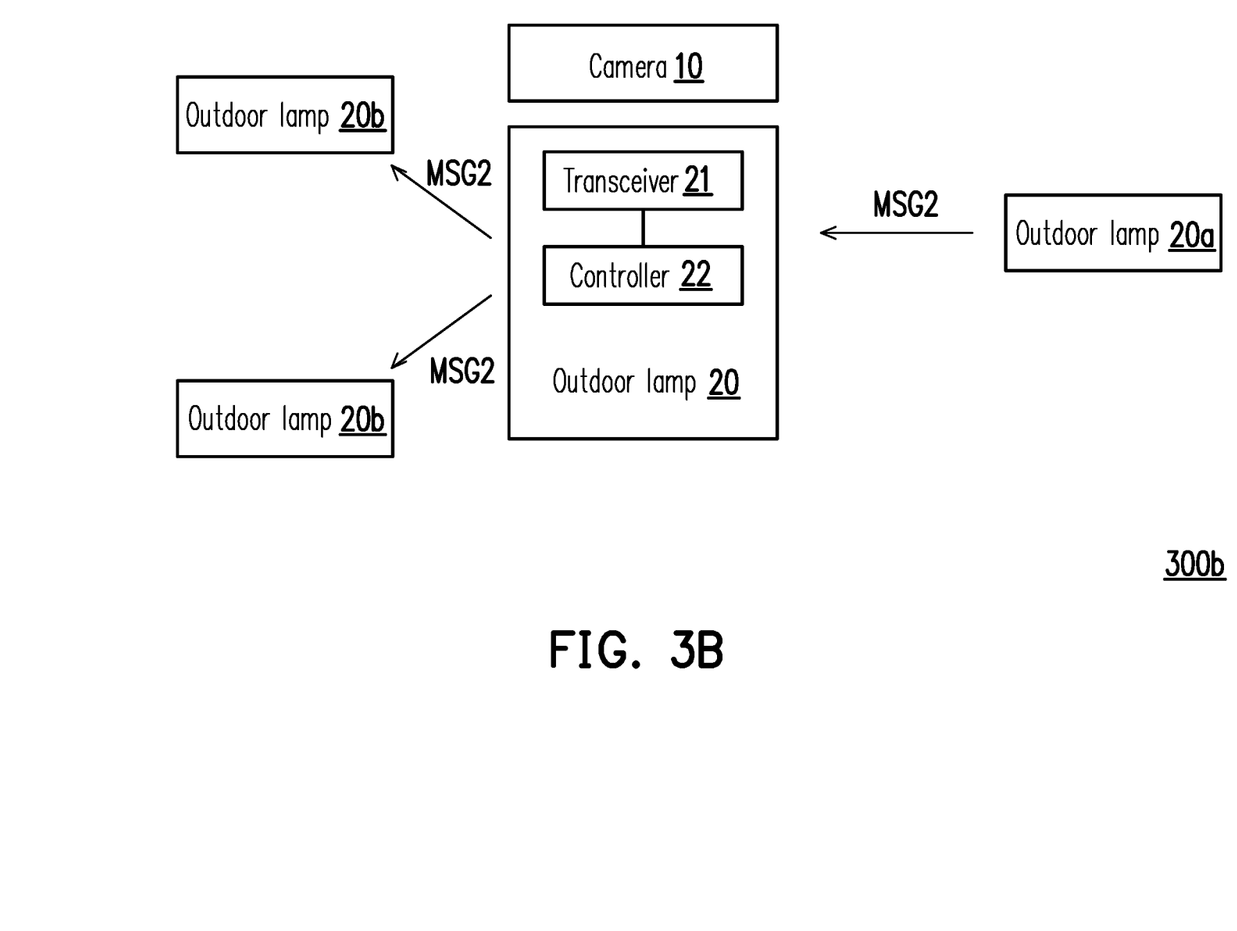
FIG. 3B is a schematic diagram illustrating a system for providing road condition information according to another embodiment of the disclosure.

Referring to FIG. 3B, FIG. 3B is a schematic diagram illustrating a system for providing road condition information according to another embodiment of the disclosure. As shown in FIG. 3B, a system 300b for providing road condition information includes the camera 10 and the outdoor lamps 20, 20a, and 20b. What differs from the scenario shown in FIG. 3A is that road condition message MSG2 in FIG. 3B may be generated by a camera (not shown) on another outdoor lamp by carrying out the respective steps in FIG. 2 and be broadcasted to the outdoor lamp 20a. Then, the outdoor lamp 20a may forward the road condition message MSG2 to the outdoor lamp 20 within the communication range of the outdoor lamp 20a.

In the embodiment, when the transceiver 21 in the outdoor lamp 20 receives the road condition message MSG2 from the transceiver of the outdoor lamp 20a, the controller 22 of the outdoor lamp 20 may control the transceiver 21 of the outdoor lamp 20 to forward the road condition message MSG2 to other vehicles and outdoor lamps (e.g., the outdoor lamp 20b) within the communication range of the outdoor lamp 20. Accordingly, a vehicle relatively distant from the location of the location information may be informed of the road condition information from the road condition message MSG2, and the driver may take a corresponding responding action as soon as possible.

Figure 4:
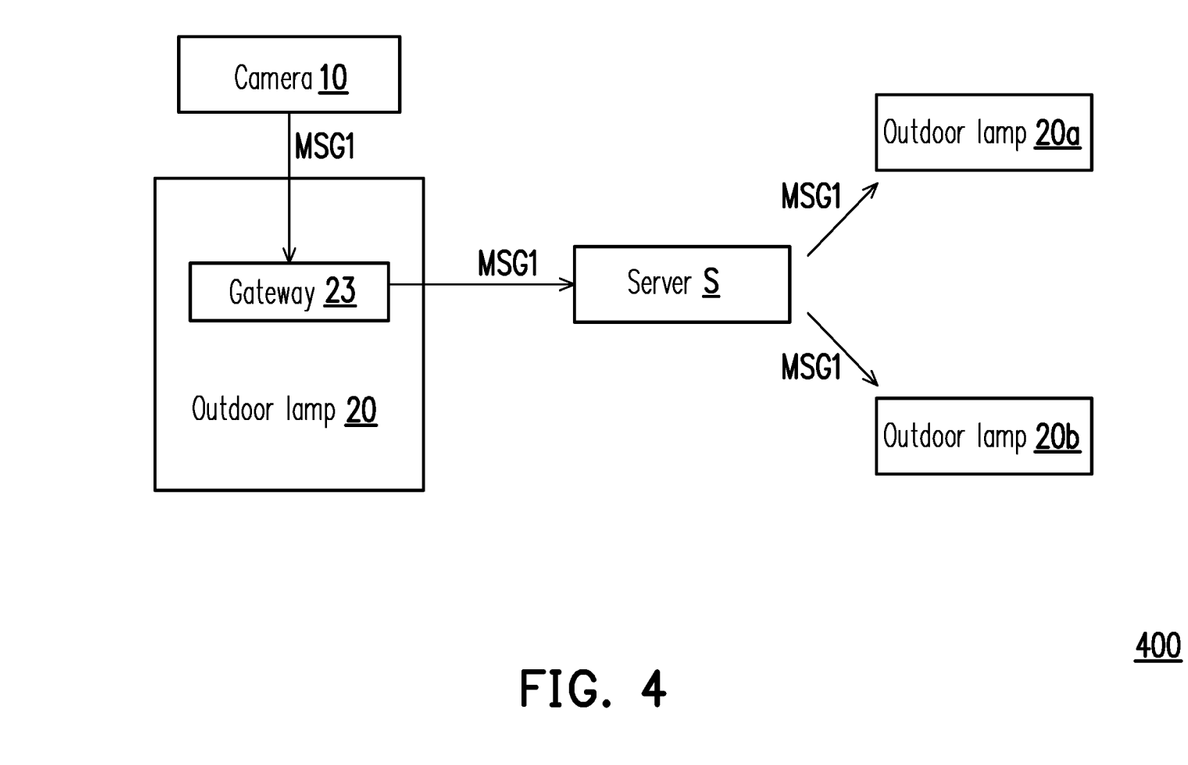
FIG. 4 is a schematic diagram illustrating a system for providing road condition information according to yet another embodiment of the disclosure.

Referring to FIG. 4, FIG. 4 is a schematic diagram illustrating a system for providing road condition information according to yet another embodiment of the disclosure. As shown in FIG. 4, the outdoor lamp 20 may include a gateway 23 coupled to the camera 10. In other embodiments, the camera 10 itself may also have a gateway function. In the embodiment, the gateway 23 may communicate with the server S based on 2G, 3G, 4G, 5G, optical fiber, or other communication mechanisms, and the server S is, for example, a cloud server managing all the outdoor lamps 20, 20a, and 20b.

In FIG. 4, the camera 10 may generate the road condition message MSG1 by carrying out the respective steps shown in FIG. 2 based on the teaching of the foregoing embodiments, and may transmit the road condition message MSG1 to the gateway 23 in the outdoor lamp 20. When the gateway 23 of the outdoor lamp 20 receives the road condition message MSG1 from the camera 10, the gateway 23 of the outdoor lamp 20 may transmit the road condition message MSG1 to the server S. Then, the server S may analyze the location information in the road condition message MSG1, and correspondingly forward the road condition message MSG1 to the outdoor lamps 20a and 20b, where a distance between the lamp 20a (or 20b) and the location of the location information is shorter than a predetermined distance. In other words, the server S may find out the outdoor lamps near the location of the location information, and transmit the road condition message MSG1 to the outdoor lamps. Consequently, the outdoor lamps may correspondingly provide the road condition message MSG1 to vehicles within the respective communication ranges of the outdoor lamps, and the drivers of the vehicles are thereby informed of the road condition information in the road condition message MSG1.

In another embodiment, when the outdoor lamp 20 receives road condition message (not shown) from another outdoor lamp, the gateway 23 of the outdoor lamp 20 may also transmit the road condition message to the server S. Then, the server S may analyze the location information in the road condition message, and correspondingly forward the road condition message to other outdoor lamps in a distance to the location of the location information shorter than the predetermined distance. Consequently, the outdoor lamps may correspondingly provide the road condition message to vehicles within the respective communication ranges of the outdoor lamps, and the drivers of the vehicles may thus have a grasp of the road condition information in the road condition message.

In view of the foregoing, in the system for providing road condition information and the method for providing road condition information according to the embodiments of the disclosure, the camera may determine whether an event occurs in the surrounding under surveillance through image recognition, and generate the road condition message based on the location and the aspect of the event after an event occurs. Thus, through the mechanism of broadcasting the road condition message to vehicles, the vehicles may decode the road condition message and provide the road condition information in the road condition message for the drivers' reference. Hence, the drivers may take a responding action, such as taking a different route, to avoid traffic jam or other accidents.

Besides, with the mechanism of setting the certification field in the road condition message, it is possible to allow only some vehicles meeting the predetermined condition to successfully decode the road condition message. Accordingly, some non-eligible vehicles are prevented from retrieving the road condition information in the road condition message when receiving the road condition message.

Besides, the outdoor lamps in the embodiments of the disclosure may be configured to receive the road condition message and forward the road condition message to other outdoor lamps or vehicles. Thus, the range of transmission of the road condition message is expanded, and the vehicles relatively distant from the location of the location information may be informed of the road condition information from the road condition message. Hence, the drivers are able to take a responding action as soon as possible.

Moreover, the outdoor lamps in the embodiments of the disclosure may communicate with the server by the gateway disposed in the lamp and further forward the received road condition message to the server. Thus, the server may correspondingly forward the road condition message to the outdoor lamps near the location of the location information. Accordingly, the drivers of the vehicles near the location of the location information may have a grasp of the road condition information in the road condition message and take a corresponding action as soon as possible.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A system for providing road condition information, comprising:
   a first outdoor lamp; and
   a first camera, disposed on the first outdoor lamp and configured to:
   capture an image of a surrounding of a location where the first camera is located;
   perform an image recognition process on the image to identify an event occurring in the surrounding;
   generate a first road condition message based on the event, wherein the first road condition message comprises location information of the event and event information of the event; and
   broadcast the first road condition message to a first vehicle, wherein the first road condition message further comprises first warning information and second warning information, wherein the first warning information is exclusively for the first vehicle meeting a first predetermined condition, and the second warning information is exclusively for a second vehicle meeting a second predetermined condition, wherein the first vehicle meeting the first predetermined condition comprises a rescue car, the first warning information comprises heading to a location of the event, the second vehicle meeting the second predetermined condition comprises a chauffeuring car, and the second warning information comprises avoiding passing the location of the event.

2. The system for providing road condition information as claimed in claim 1, further comprising a second outdoor lamp comprising a controller and a transceiver, wherein when the transceiver of the second outdoor lamp receives the first road condition message from the first camera, the controller of the second outdoor lamp controls the transceiver of the second outdoor lamp to forward the first road condition message to a second vehicle.

3. The system for providing road condition information as claimed in claim 2, further comprising a third outdoor lamp comprising a controller and a transceiver, wherein when the transceiver of the third outdoor lamp receives the first road condition message from the second outdoor lamp, the controller of the third outdoor lamp controls the transceiver of the third outdoor lamp to forward the first road condition message to a third vehicle.

4. The system for providing road condition information as claimed in claim 1, further comprising a second outdoor lamp, wherein each of the first outdoor lamp and the second outdoor lamp comprises a controller and a transceiver, when the transceiver of the first outdoor lamp receives a second road condition message from the transceiver of the second outdoor lamp, the controller of the first outdoor lamp controls the transceiver of the first outdoor lamp to forward the second road condition message to the first vehicle or a third outdoor lamp.

5. The system for providing road condition information as claimed in claim 1, further comprising a server, wherein the first outdoor lamp further comprises a gateway, when the gateway receives the first road condition message, the gateway transmits the first road condition message to the server, and the server analyzes the location information in the first road condition message and correspondingly forward the first road condition message to at least one second outdoor lamp, wherein a distance between the at least one second outdoor lamp and a location of the location information is shorter than a predetermined distance.

6. The system for providing road condition information as claimed in claim 1, wherein the first outdoor lamp comprises a street lamp and a traffic signal lamp.

7. The system for providing road condition information as claimed in claim 1, wherein a format of the first road condition message comprises a certification field for the first vehicle meeting a predetermined condition to identify.

8. The system for providing road condition information as claimed in claim 1, wherein when the event matches a predetermined event, the first camera further adds a specific certification code corresponding to the predetermined event to the first road condition message, and the first road condition message is decoded by the first vehicle corresponding to the specific certification code.

9. A method for providing road condition information, comprising:
  capturing, by a camera, an image of a surrounding of a location where a first camera is located, wherein the first camera is disposed on a first outdoor lamp;
  performing, by the camera, an image recognition process on the image to identify an event occurring in the surrounding;
  generating, by the camera, a first road condition message based on the event, wherein the first road condition message comprises location information of the event and event information of the event; and
  broadcasting, by the camera, the first road condition message to a first vehicle, wherein the first road condition message further comprises first warning information and second warning information, wherein the first warning information is exclusively for the first vehicle meeting a first predetermined condition, and the second warning information is exclusively for a second vehicle meeting a second predetermined condition, wherein the first vehicle meeting the first predetermined condition comprises a rescue car, the first warning information comprises heading to a location of the event, the second vehicle meeting the second predetermined condition comprises a chauffeuring car, and the second warning information comprises avoiding passing the location of the event.

10. The method for providing road condition information as claimed in claim 9, further comprising:
  controlling a transceiver of a second outdoor lamp by a controller of the second outdoor lamp to forward the first road condition message to a second vehicle when the transceiver of the second outdoor lamp receives the first road condition message from the first camera.

11. The method for providing road condition information as claimed in claim 10, further comprising:
  controlling a transceiver of a third outdoor lamp by a controller of the third outdoor lamp to forward the first road condition message to a third vehicle when the transceiver of the third outdoor lamp receives the first road condition message from the second outdoor lamp.

12. The method for providing road condition information as claimed in claim 9, further comprising:
  controlling a transceiver of the first outdoor lamp by a controller of the first outdoor lamp to forward a second road condition message to the first vehicle or a third outdoor lamp when the transceiver of the first outdoor lamp receives the second road condition message from a transceiver of the second outdoor lamp.

13. The method for providing road condition information as claimed in claim 9, further comprising:
  transmitting the first road condition message to a server by a gateway of the first outdoor lamp when the gateway receives the first road condition message;
  analyzing the location information in the first road condition message by the server; and
  correspondingly forwarding the first road condition message to at least one second outdoor lamp by the server, wherein a distance between the at least one second outdoor lamp and a location of the location information is shorter than a predetermined distance.

14. The method for providing road condition information as claimed in claim 10, wherein a format of the first road condition message comprises a certification field for the first vehicle meeting a predetermined condition to identify.

15. The method for providing road condition information as claimed in claim 10, further comprising:
  adding a specific certification code corresponding to a predetermined event to the first road condition message by the first camera when the event matches the predetermined event; and
  interpreting the first road condition message by a vehicle corresponding to the specific certification code.

16. A camera, comprising:
  a storage circuit, storing a plurality of program modules;
  a transceiver;
  an image capturing circuit; and
  a processor, coupled to the storage circuit, the transceiver, and the image capturing circuit, wherein the processor accesses the program modules to:
  control the image capturing circuit to capture an image of a surrounding of a location where the camera is located; and
  perform an image recognition process on the image to identify an event occurring in the surrounding;

generate road condition message based on the event, wherein the road condition message comprises location information of the event and event information of the event; and control the transceiver to broadcast the road condition message to a vehicle, wherein the road condition message further comprises first warning information and second warning information, wherein the first warning information is exclusively for the first vehicle meeting a first predetermined condition, and the second warning information is exclusively for a second vehicle meeting a second predetermined condition, wherein the first vehicle meeting the first predetermined condition comprises a rescue car, the first warning information comprises heading to a location of the event, the second vehicle meeting the second predetermined condition comprises a chauffeuring car, and the second warning information comprises avoiding passing the location of the event.

* * * * *